(12) United States Patent
Greene et al.

(10) Patent No.: US 8,381,429 B2
(45) Date of Patent: Feb. 26, 2013

(54) FISHERMAN'S TUBE SHAPED SKIRTED LURE

(75) Inventors: Daryl W Greene, Pawleys Island, SC (US); Van Troung, Ho Chi Minh (VN)

(73) Assignee: Greene Le Corp, Pawleys Island, SC (US)

( * ) Notice: Subject to any disclaimer, the term of this patent is extended or adjusted under 35 U.S.C. 154(b) by 447 days.

(21) Appl. No.: 12/655,322

(22) Filed: Dec. 29, 2009

(65) Prior Publication Data

US 2010/0162613 A1    Jul. 1, 2010

Related U.S. Application Data

(60) Provisional application No. 61/204,071, filed on Dec. 31, 2008.

(51) Int. Cl.
*A01K 85/00*    (2006.01)
(52) U.S. Cl. ...................... 43/42.25; 43/42.28
(58) Field of Classification Search ....... 43/42.25–42.29
See application file for complete search history.

(56) References Cited

U.S. PATENT DOCUMENTS

| | | | | |
|---|---|---|---|---|
| 2,161,094 A * | 6/1939 | Saunders, Jr. | ................ | 43/42.08 |
| 2,817,922 A * | 12/1957 | Takeshita | ................ | 43/42.28 |
| 3,230,656 A * | 1/1966 | Kozjak | ................ | 43/42.1 |
| 3,769,738 A * | 11/1973 | Begley | ................ | 43/42.26 |
| 4,015,363 A * | 4/1977 | Sedlak | ................ | 43/42.22 |
| 4,163,337 A * | 8/1979 | Kress | ................ | 43/42.5 |
| 4,619,067 A * | 10/1986 | West | ................ | 43/42.09 |
| 4,887,378 A * | 12/1989 | Sheehan et al. | ................ | 43/42.25 |
| 5,094,026 A * | 3/1992 | Correll et al. | ................ | 43/42.28 |
| 5,167,089 A * | 12/1992 | Schriefer | ................ | 43/42.36 |
| 5,261,182 A * | 11/1993 | Link | ................ | 43/42.36 |
| 5,299,378 A * | 4/1994 | Ballard | ................ | 43/42.06 |
| 5,361,531 A * | 11/1994 | Rodrigues | ................ | 43/42.09 |
| 5,491,927 A * | 2/1996 | Ortiz | ................ | 43/42.28 |
| 6,199,312 B1 * | 3/2001 | Link | ................ | 43/42.24 |
| 6,357,167 B1 * | 3/2002 | Bradford | ................ | 43/42.09 |
| 7,076,911 B2 * | 7/2006 | Thorne | ................ | 43/42.26 |
| 7,647,722 B2 * | 1/2010 | Shelton et al. | ................ | 43/42.53 |
| 2002/0073607 A1 * | 6/2002 | Hickok et al. | ................ | 43/42.25 |
| 2003/0196369 A1 * | 10/2003 | Luke | ................ | 43/42.28 |
| 2006/0042147 A1 * | 3/2006 | Jenkins | ................ | 43/42.09 |
| 2006/0185220 A1 * | 8/2006 | Greene et al. | ................ | 43/42.28 |
| 2006/0260179 A1 * | 11/2006 | Guigo | ................ | 43/42.36 |
| 2008/0295385 A1 * | 12/2008 | Shelton et al. | ................ | 43/42.25 |
| 2010/0325936 A1 * | 12/2010 | Greene et al. | ................ | 43/42.1 |

* cited by examiner

*Primary Examiner* — Christopher P Ellis
(74) *Attorney, Agent, or Firm* — J. Bennett Mullinax, LLC

(57) ABSTRACT

A tube shaped skirted lure comprising a flexible cylindrical silicon tube having a closed end and an open end. A circular channel surrounding the open end and a plurality of flat silicon blanks, each blank having a tab end and a plurality of flexible strands. The circular channel having a "U" shaped cross section. Each tab inserted into the channel and adhesively attached in the channel such that the open end has a plurality of flexible strands radiating out from the open end.

17 Claims, 4 Drawing Sheets

FISHERMAN'S TUBE SHAPED SKIRTED LURE

CROSS REFERENCES TO RELATED APPLICATIONS

U.S. Provisional Application for Pat. No. 61/204,071, filed Dec. 31, 2008, with the title 'Fisher's Tube Shaped Skirted Lure' is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable

BACKGROUND OF THE INVENTION

1. Field of the Invention.

This invention relates to a fishers tube shaped skirted lure.

2. Brief Description of Prior Art.

One piece, tube shaped, skirted lures are well known and generally comprise a one piece PLASTISOL (TM) or other pourable plastic elastomer shaped body where one end is a closed bulbous end and the other end an open end, from which a multiple strands are created by slitting the open end into the multiple strands to form a skirted tube.

The skirted tube, being made of a pourable plastic elastomer, can be compounded to various colors, glitters, and other properties, to attract fish under various conditions. It is easy to manufacture. However, it exhibits limited durability, the coloration of the plastic elastomer multiple strands is limited to color and glitter only, and the pulsation action of the plastic elastomer multiple strands as retrieved through the water is minimal.

In mankind's epochal struggle to prove itself smarter than fish, said fish seemingly get even more difficult to catch.

As will be seen from the subsequent description, the preferred embodiments of the present invention overcome shortcomings of the prior art.

SUMMARY OF THE INVENTION

The present invention in the preferred embodiment is a tube shaped, skirted fishing lure that comprises a silicon skirted tube, wherein said tube has a closed end and an open end, said open end having a channel to receive blank strands. Blanks comprising a tab end and multiple strand filaments are inserted into the channel with the tab end of each blank in said channel. The tab ends of the blanks are fused in place via liquid silicone or RTV, pressure and heat.

BRIEF DESCRIPTION OF THE DRAWINGS

FIG. 2A is an enlargement of a portion of the tube skirt.

DESCRIPTION OF THE PREFERRED EMBODIMENT

Figure 1:
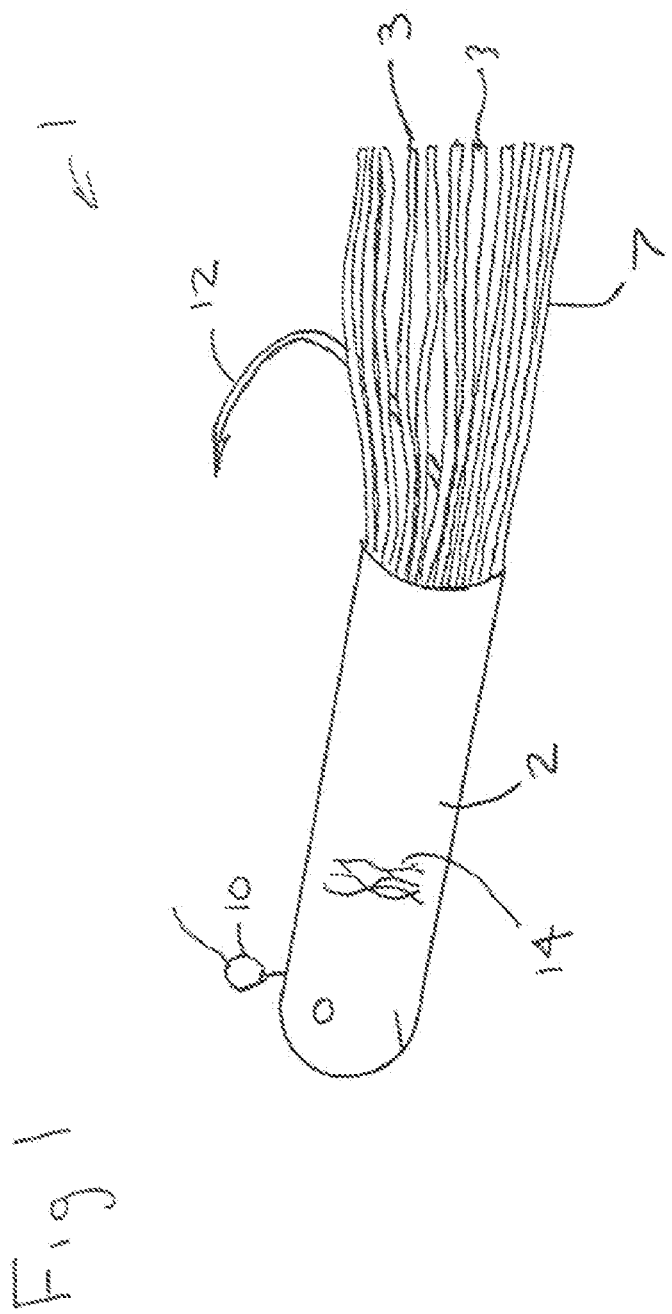
FIG. 1 illustrates the preferred embodiment of the present invention, a fisherman's tube shaped skirted lure with lure body in place.

In accordance with the present invention, FIG. 1 shows a tube shaped skirted lure 1 including a silicon closed end tube 2 and a silicon skirt 7. The skirt 7 includes multiple silicon filaments 3. The lure 1 includes an eye 10 and hook end 12 and can include decorations 14 which can be silk screen printed on the surface of the tube 2 and skirt 7. Decorations 14 can include glitter contained inside the silicon, giving a perception of depth and can include chrome foil transfer. All of these decorations work better or give different results than would be possible with prior art tube skirts of other material.

Figure 2:
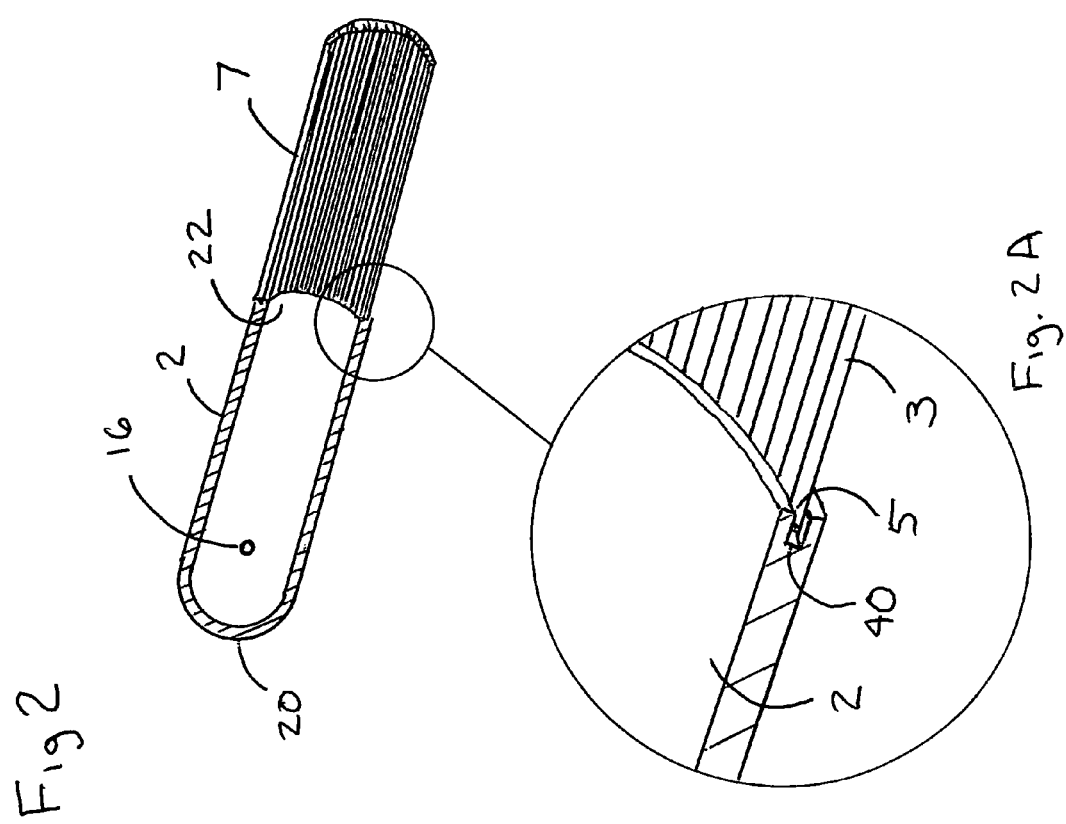
FIG. 2 illustrates details of the tube skirt.

FIG. 2 shows a cross sectional view of the tube skirt 2 and skirt 7 with the rest of the lure (see FIG. 4) removed for clarity. The tube skirt 2 includes an opening 16 such as a hole through which the eye 10 of the lure 1 is received when the tube skirt lure 1 is assembled. The tube 2 includes a closed end 20 and an open end 22 connected by a flexible tubular wall. As seen in enlargement 2A the open end 22 of the tube 2 includes a circular channel 40 that has a general 'U' shape that receives the tab 5 of each blank 4 (see FIG. 3). The circular channel 40 surrounds the open end 22 of the tube 2. The tabs 5 are secured with an adhesive such as RTV or liquid silicon and acetone mixture using pressure and heat for example.

Figure 3:
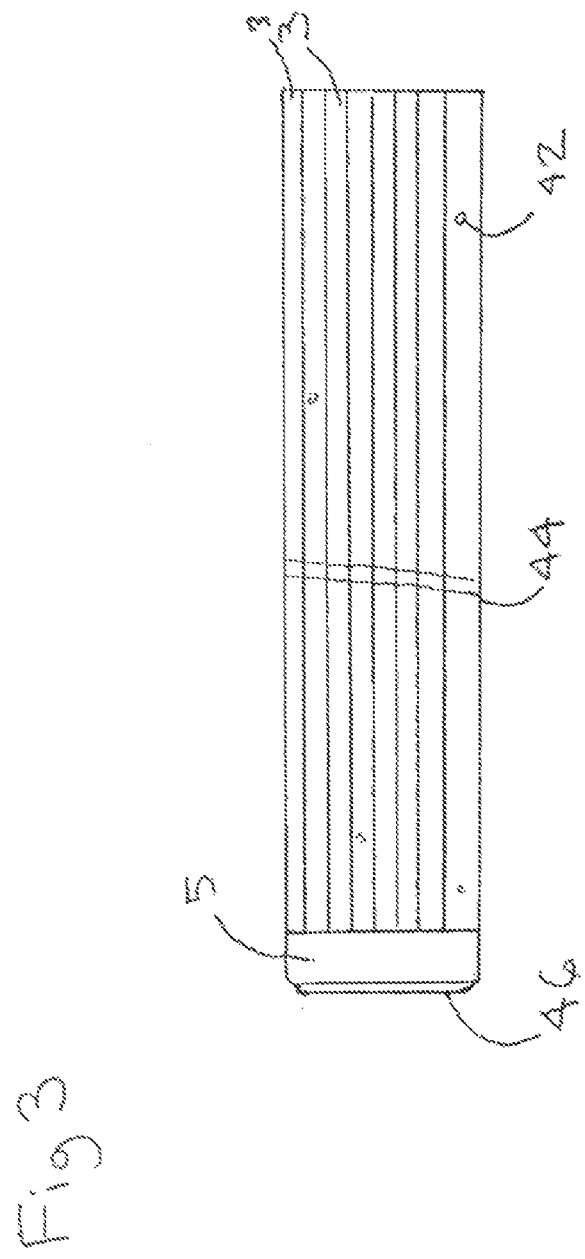
FIG. 3 illustrates a blank with a tab and filaments and FIG. 4. illustrates a tube skirt lure body.

FIG. 3 shows a multi-filament blank 4 that has a tab end 5 and a plurality of filaments 3. The filaments can include decorations such as glitter 42 or printing 44. The tab 5 can include adhesive 46 applied just before it is placed in the channel 40. Alternatively the adhesive 46 can be placed in the channel 40 prior to inserting the tab 5. The skirt 7 is formed by inserting a plurality of blank tab ends 5 into the channel 40. The channel 40 has a 'U' shaped cross section and is circular to match the open end 22 of the tube 2.

Figure 4:
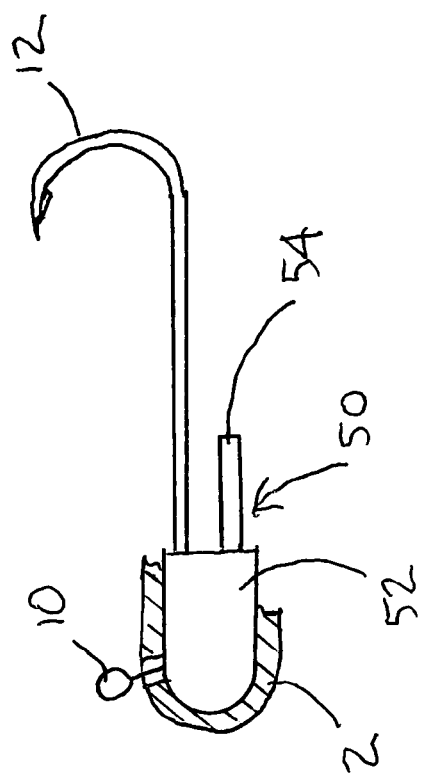

FIG. 4 shows a tube jig 50 which is designed to be inserted into the tube 2, shown cut away for clarity. The tube jig includes the eye 10, a hook 12, a weight 52 and (optional) rattle 54. The jig fits into the tube 2 with the eye 10 protruding through the opening 16.

The skirt 7 is formed by inserting the tab end 5 of multiple blanks 4 into the channel 40 of the open end 22 of the tube 2 around the entire circumference of the tube 2. A bead of adhesive is placed on the tab 5 or in the channel 40 or both and once the adhesive is tacky, the tab ends are inserted into the channel 40. The tab 5 ends are protected from wear and present a neat appearance with the adhesive 46 hidden in the channel 40. The tube 2 and skirt are then heated at 60 degrees centigrade for at least 5 minutes bond the adhesive. The resulting lure 1 has strands 3 trailing outward from the open end 22 of the tube 2. Once the skirt is on the tube a tube jig 50 can be inserted into the tube 2 through the open end 22 and the eye can be aligned with the hole 10. The advantage of the silicon is that the silicone lure 1 exhibits greater flexibility and enables a variety of coloration in that the silicon tube 2 and strands 3 of the skirt 7 can be silk screen printed and a chrome foil transfer application can be employed as well as colors adjusted and glitter added. Also the silicon skirt 7 strands 3 exhibit a superior pulsating fish attracting action as the lure 1 is retrieved through water.

Although the description above contains many specificities, these should not be construed as limiting the scope of the invention but as merely providing illustrations of some of the presently preferred embodiments of this invention. Thus the scope of the invention should be determined by the appended claims in the formal application and their legal equivalents, rather than by the examples given.

We claim:

1. A fisherman's tube shaped skirted lure comprising;
   a flexible cylindrical silicon tube having a closed end and an open end;
   a circular channel having a "U" shaped cross section surrounding the open end;

a plurality of flat silicon blanks, each blank having a tab end and a plurality of flexible strands, each tab inserted into said channel and adhesively attached in said channel such that the open end has a plurality of flexible strands radiating out from the open end, wherein the tube has a terminal end surface and an exterior surface that extends from the terminal end surface, wherein the tube has an interior surface that extends from the terminal end surface, wherein the channel is located at the terminal end surface, wherein the tab is free from engagement with the exterior surface and the interior surface of the tube.

2. The fishing lure of claim 1 including a jig inserted through said open end into said tube such that an eye of said jig protrudes through a hole in said tube such that a fishing line can be attached to said eye.

3. The fishing lure of claim 2 wherein said jig includes a hook that protrudes out through the open end of said tube and said hook is partially obscured by said flexible strands.

4. The fishing lure of claim 1 wherein said tube includes at least one decoration chosen from the decorations glitter, silk screen printing and foil.

5. The fishing lure of claim 1 includes a lead weight and rattle inside said cylindrical silicon tube.

6. The fishing lure of claim 4 wherein at least a portion of said decorations are inside the silicon.

7. A fishing lure comprising;

a flexible cylindrical silicon tube having a closed end and an open end;

a circular "U" shaped channel surrounding the open end;

a plurality of flat silicon blanks, each blank having a tab end and a plurality of flexible strands, each tab inserted into said channel and adhesively attached in said channel such that the open end has a plurality of flexible strands radiating out from the open end, wherein the tube has a terminal end surface and an exterior surface that extends from the terminal end surface, wherein the tube has an interior surface that extends from the terminal end surface, wherein the channel is located at the terminal end surface, wherein the tab is free from engagement with the exterior surface and the interior surface of the tube.

8. The fishing lure of claim 7 including a jig in said tube such that an eye of said jig protrudes through an opening in said tube such that a fishing line is attached to said eye.

9. The fishing lure of claim 8 wherein said jig includes a hook that protrudes out through the open end of said tube.

10. The fishing lure of claim 8 wherein said tube and skirt include at least one decoration chosen from the decorations glitter, silk screen printing and foil.

11. The fishing lure of claim 10 wherein at least a portion of said decorations are inside the silicon.

12. The fishing lure of claim 10 includes a lead weight and rattle inside said cylindrical silicon tube.

13. A fishing lure comprising;

a flexible cylindrical silicon tube having an open end;

wherein the tube has a terminal end surface and an exterior surface that extends from the terminal end surface, wherein the tube has an interior surface that extends from the terminal end surface, wherein a channel is located at the terminal end surface and surrounds the open end, wherein the tab is free from engagement with the exterior surface and the interior surface of the tube, a plurality of flat silicon blanks, each blank having a tab end and a plurality of flexible strands, each tab inserted into said channel and adhesively attached in said channel such that the open end has a plurality of flexible strands radiating out from the open end.

14. The fishing lure of claim 13 including a jig in said tube, an eye of said jig protrudes through an opening in said tube such that a fishing line is attached to said eye.

15. The fishing lure of claim 13 wherein said open end is circular and said channel is circular.

16. The fishing lure of claim 14 wherein said jig includes a hook that protrudes out through the open end of said tube.

17. The fishing lure of claim 13 wherein said tube and skirt include decorative indicia and wherein said silicon is at least partially transparent giving said decorations a three dimensional appearance.

* * * * *